(12) United States Patent
Holdampf

(10) Patent No.: US 7,850,220 B2
(45) Date of Patent: Dec. 14, 2010

(54) MONO LEG TRANSFORMER SEAT

(75) Inventor: Carl J. Holdampf, Farmington Hills, MI (US)

(73) Assignee: Intier Automotive Inc., Newmarket (CA)

( * ) Notice: Subject to any disclaimer, the term of this patent is extended or adjusted under 35 U.S.C. 154(b) by 403 days.

(21) Appl. No.: 11/916,847

(22) PCT Filed: Jun. 9, 2006

(86) PCT No.: PCT/CA2006/000930

§ 371 (c)(1),
(2), (4) Date: Dec. 14, 2007

(87) PCT Pub. No.: WO2006/130975

PCT Pub. Date: Dec. 14, 2006

(65) Prior Publication Data

US 2008/0203772 A1 Aug. 28, 2008

(51) Int. Cl.
*B60N 2/30* (2006.01)
(52) U.S. Cl. ............... 296/65.13; 296/65.09; 297/15
(58) Field of Classification Search ............ 296/65.05, 296/65.09, 65.13; 297/15
See application file for complete search history.

(56) References Cited

U.S. PATENT DOCUMENTS

| | | | |
|---|---|---|---|
| 1,458,628 A | | 6/1923 | Pardy |
| 4,105,245 A | | 8/1978 | Simons et al. |
| 4,461,511 A | * | 7/1984 | Berneking et al. ...... 297/354.12 |
| 4,793,649 A | | 12/1988 | Yamano et al. |
| 4,986,591 A | | 1/1991 | Martienssen et al. |
| 5,195,795 A | * | 3/1993 | Cannera et al. .......... 296/65.09 |
| 5,383,699 A | * | 1/1995 | Woziekonski et al. .... 296/65.09 |
| 5,482,349 A | | 1/1996 | Richter et al. |
| 5,527,087 A | | 6/1996 | Takeda et al. |
| 6,106,046 A | | 8/2000 | Reichel |
| 6,199,951 B1 | | 3/2001 | Zeile et al. |
| 6,234,553 B1 | * | 5/2001 | Eschelbach et al. ...... 296/65.14 |
| 6,293,603 B1 | | 9/2001 | Waku et al. |
| 6,435,589 B2 | | 8/2002 | Shimizu et al. |
| 6,644,730 B2 | * | 11/2003 | Sugiura et al. ................ 297/15 |
| 6,869,138 B2 | * | 3/2005 | Rhodes et al. ............... 297/15 |

(Continued)

FOREIGN PATENT DOCUMENTS

CA 2479117 A1 9/2003

(Continued)

*Primary Examiner*—Glenn Dayoan
*Assistant Examiner*—Gregory Blankenship
(74) *Attorney, Agent, or Firm*—Clark Hill PLC

(57) ABSTRACT

A vehicle seat assembly for supporting an occupant above a floor having a recess includes a seat cushion and seat back pivotally coupled thereto. A riser mechanism includes at least one front and rear leg, each leg extending between a lower end pivotally coupled to the floor and an upper end pivotally coupled to the seat cushion. A seat adjustment mechanism disposed between the seat cushion and upper end of the rear leg is operable between locked and unlocked states allowing the legs to pivot about the lower ends thereby moving the seat assembly between a seating position and a stowed position disposed in the recess. An arcuate channel is operatively coupled to the rear leg selectively receiving a laterally extending guide pin mounted to the front leg for operatively coupling the front and rear legs to rotate together as the seat assembly moves between the seating and stowed positions.

30 Claims, 14 Drawing Sheets

U.S. PATENT DOCUMENTS

| | | |
|---|---|---|
| 6,883,854 B2 | 4/2005 | Daniel |
| 7,134,725 B2 * | 11/2006 | Hofmann et al. .......... 297/378.1 |
| 7,201,426 B2 * | 4/2007 | Villeminey .............. 296/65.09 |
| 7,497,511 B2 * | 3/2009 | Park et al. ..................... 297/15 |
| 7,503,613 B2 * | 3/2009 | Holdampf ................ 296/65.05 |
| 7,562,926 B2 * | 7/2009 | Kojima .................... 296/65.13 |
| 2006/0138796 A1 * | 6/2006 | Tame et al. .............. 296/65.09 |
| 2007/0046061 A1 * | 3/2007 | Villeminey .............. 296/65.09 |
| 2009/0243323 A1 * | 10/2009 | Mitsuhashi .............. 296/65.05 |

FOREIGN PATENT DOCUMENTS

| | | |
|---|---|---|
| DE | 10344978 A1 | 5/2005 |
| WO | 2005095150 A1 | 10/2005 |

* cited by examiner

MONO LEG TRANSFORMER SEAT

FIELD OF THE INVENTION

The invention relates to a seat assembly for an automotive vehicle. More particularly, the invention relates to a seat assembly that is movable between a seating position and a stowed position within a recess formed in a floor of an automotive vehicle.

DESCRIPTION OF RELATED ART

Automotive vehicles include seat assemblies for supporting occupants above a floor within a vehicle interior. Seat assemblies typically include a seat cushion and a seat back pivotally coupled to the seat cushion by a recliner mechanism for movement between a plurality of reclined seating positions. Typically, the seat back is also movable between any one of the reclined seating positions and a generally horizontal, forwardly folded position overlying the seat cushion in order to present a load floor surface on the back of the seat back.

It is known in the automotive vehicle seating art to mount a riser mechanism between the seat cushion and the floor of the automotive vehicle for moving the seat assembly between a seating position with the seat cushion spaced above the floor and a stowed position with the seat cushion and seat back disposed within a recess formed in the floor. Consequently, it is desirable to provide an improved structure for selectively moving the seat assembly between the seating position and the stowed position within the recess in the floor.

SUMMARY OF THE INVENTION

According to one aspect of the invention, a seat assembly is provided for supporting an occupant in an automotive vehicle above a floor having a recess. The seat assembly includes a seat cushion and a seat back pivotally coupled to the seat cushion. The seat back is selectively moveable between a plurality of reclined seating positions and a forwardly folded flat position overlying the seat cushion. The seat assembly also includes a riser mechanism having at least one front and rear leg. Each of the front and rear legs extend between a lower end adapted to be pivotally coupled to the floor and an upper end pivotally coupled to the seat cushion. The front and rear legs are offset laterally such that they rotate in different planes. A seat adjustment mechanism is disposed between the seat cushion and the upper end of the rear leg. The seat adjustment mechanism is operable between a locked state and an unlocked state for allowing the front and rear legs to pivot about the lower ends while the seat cushion pivots about the upper ends thereby moving the seat assembly between a seating position with the seat cushion spaced above the floor and a stowed position with the seat cushion and seat back disposed in the recess in the floor. An arcuate channel is operatively coupled to the rear leg for selectively receiving a laterally extending guide pin mounted to the front leg. The arcuate channel and guide pin operatively couple the front and rear legs such that they rotate together as the seat assembly moves between the seating and stowed positions.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
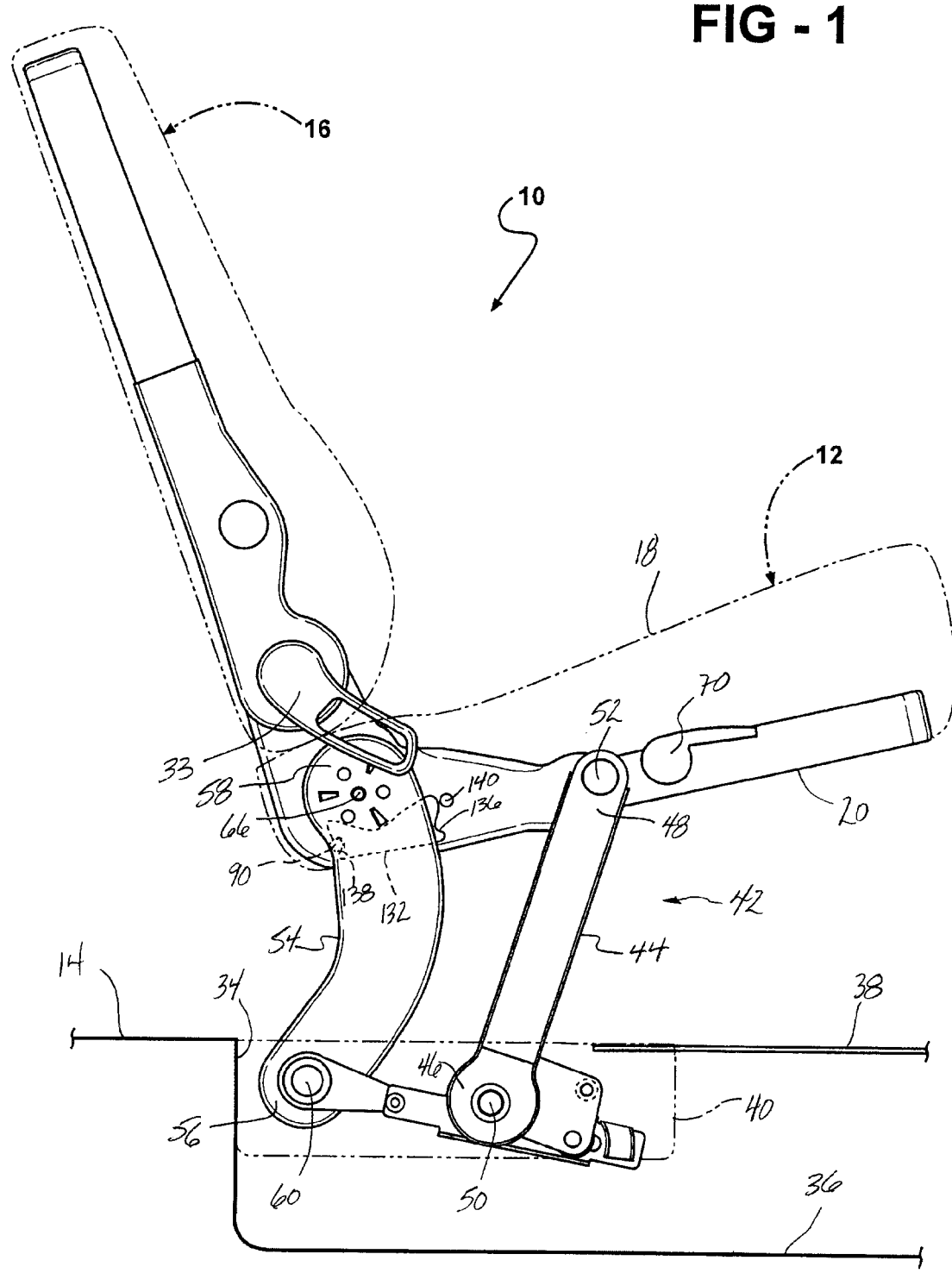
FIG. 1 is a side view of a seat assembly according to the invention in a full forward seating position.

Referring to FIG. 1, a seat assembly for an automotive vehicle is generally shown at 10. The seat assembly 10 includes a seat cushion, generally indicated at 12 for supporting an occupant above a floor 14, and a seat back, generally indicated at 16 for supporting the back of the occupant. The seat back 16 is pivotally coupled to the seat cushion 12 for providing selective adjustment of the seat back 16 between a plurality of reclined seating positions. In addition, the seat back 16 is moveable to a forwardly folded flat position overlying the seat cushion 12 for extending the cargo carrying capacity of the vehicle or when stowing the seat assembly 10 in the floor 14 as described below.

Figure 2:
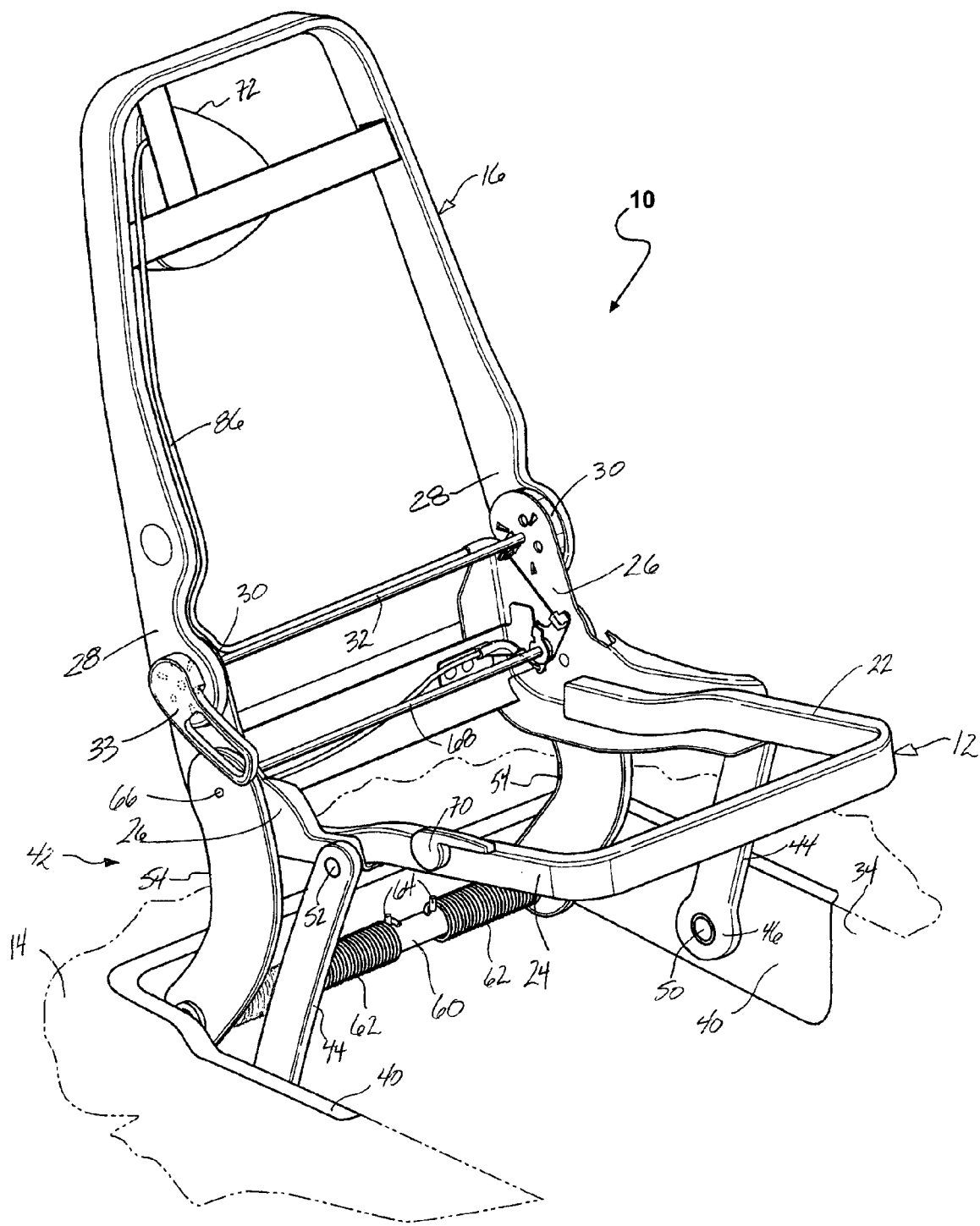
FIG. 2 is a front, right-side, perspective view of the seat assembly in the full forward seating position.
Figure 3:
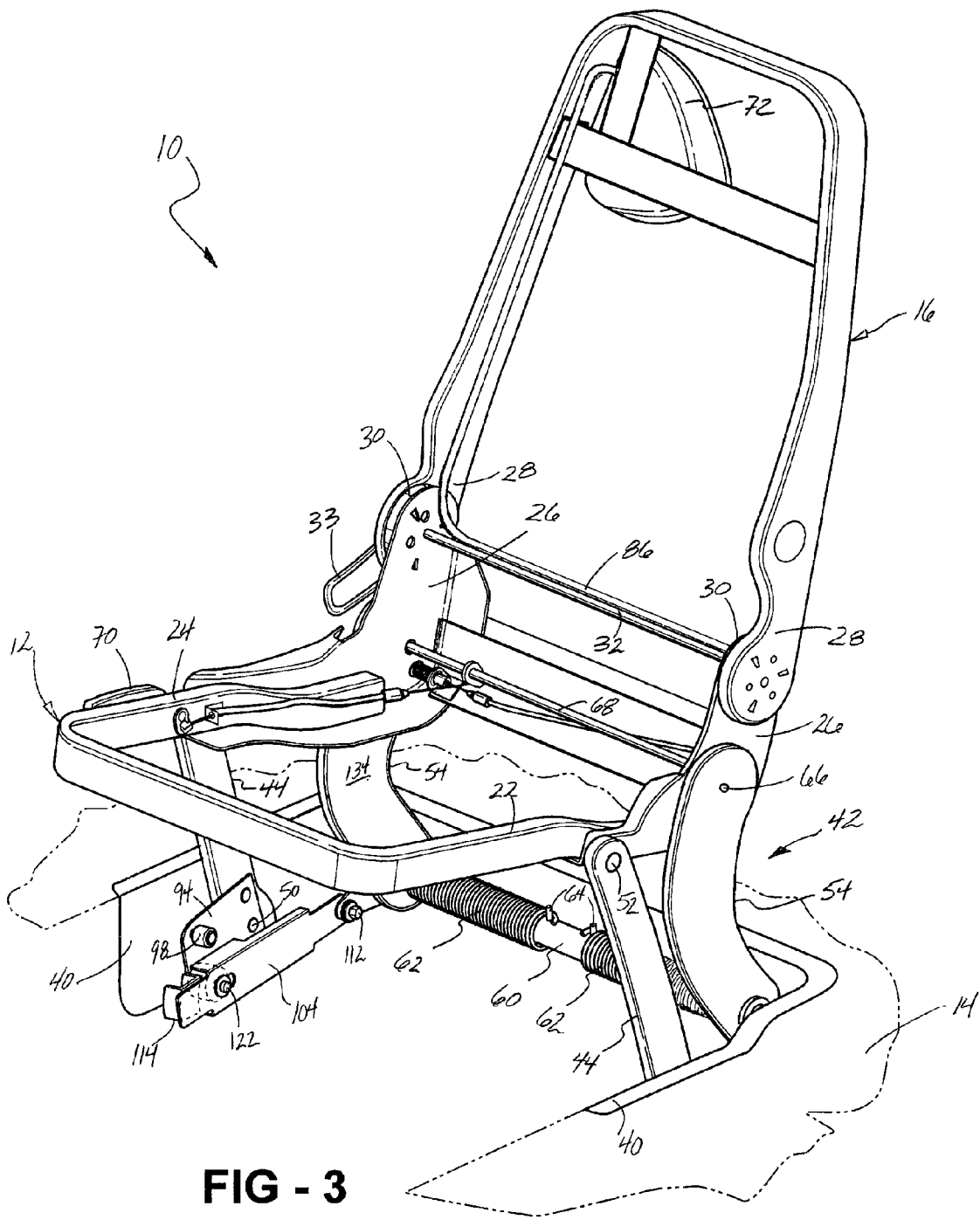
FIG. 3 is a front, left-side, perspective view of the seat assembly in the full forward seating position.

The seat cushion 12 includes a top seating surface 18 and an opposing bottom surface 20. The seat cushion 12 also includes a frame having generally parallel and spaced apart side members 22, 24, as shown in FIG. 2. Additionally, a pair of seat cushion brackets 26 is fixedly secured to the side members 22, 24.

A pair of seat back brackets 28 fixedly secured to the seat back 16 are pivotally coupled to the seat cushion brackets 26 by a pair of seat back recliner mechanisms 30 of any suitable type known to those skilled in the art. The seat back recliner mechanisms 30 are operatively coupled together by an upper cross-talk tube 32 such that a seat back recliner handle 33 mounted on one side of the seat assembly 10 actuates the seat back recliner mechanisms 30 simultaneously between locked and unlocked states.

Referring back to FIG. 1, the floor 14 includes a recess 34 formed therein having a recess bottom floor 36. The recess 34 is selectively covered by a floor panel 38. A pair of lower mounting brackets 40 is fixedly secured along the floor 14 and partially extends into the recess 34. It is, however, appreciated that the lower mounting brackets 40 may be fixedly secured inside the recess 34.

A riser mechanism, generally shown at 42, extends between the seat cushion 12 and the lower mounting brackets 40 located along the floor 14. The riser mechanism 42 allows for selective movement of the seat assembly 10 between a plurality of seating positions including a full forward seating position, shown in FIG. 1 and a full rearward seating position, shown in FIG. 4. In addition, the seat assembly 10 is movable between an easy-entry position, shown in FIG. 5, and a stowed position disposed within the recess 34 formed in the floor 14, shown in FIG. 7.

Referring to FIGS. 1 and 2, the riser mechanism 42 includes a pair of generally parallel and spaced apart front legs 44. Preferably, each of the front legs 44 extend linearly between a lower end 46 and an upper end 48. The lower end 46 of each of the front legs 44 is pivotally coupled at pivot 50 to one of the lower mounting brackets 40 located along the floor 14. The upper end 48 of each of the front legs 44 is pivotally coupled at pivot 52 to one of the side members 22, 24 of the seat cushion 12.

The riser mechanism 42 also includes a pair of generally parallel and spaced apart rear legs 54 positioned rearward and inboard of the respective front legs 44. Each of the rear legs 54 extend between a lower end 56 and an upper end 58. Preferably, each rear leg 54 has a curvature or bend between the lower 56 and upper 58 ends. The lower end 56 of each rear leg 54 is pivotally coupled to a rod 60 extending transversely between the lower mounting brackets 40 located along the floor 14. A pair of springs 62 are disposed around the rod 60. The springs 62 extend between posts 64 fixedly secured to the rod 60 and the rear legs 54. The springs 62 bias the seat assembly 10 upward. The upper end 58 of each rear leg 54 is pivotally coupled by a seat adjustment mechanism 66 to the seat cushion brackets 26 fixedly secured to the side members 22, 24 of the seat cushion 12. The seat adjustment mechanisms 66 can be a recliner mechanism of any suitable type known to those skilled in the art. The seat adjustment mechanisms 66 are operatively coupled together by a lower cross-talk tube 68 such that rotation of the lower cross-talk tube 68 actuates the seat adjustment mechanisms 66 simultaneously between locked and unlocked states.

In the unlocked state, the seat adjustment mechanisms 66 allow the front 44 and rear 54 legs to pivot forward and rearward about pivots 50 and rod 60, respectively, thus moving the seat assembly 10 fore and aft. Because the rear legs 54 are positioned inboard of the respective front legs 44, the front 44 and rear 54 legs pivot in different planes and do not interfere with one another during movement of the seat assembly 10. In the locked state, the seat adjustment mechanisms 66 prevent movement of the seat assembly 10. The seat adjustment mechanisms 66 are biased toward the locked state.

Figure 8:
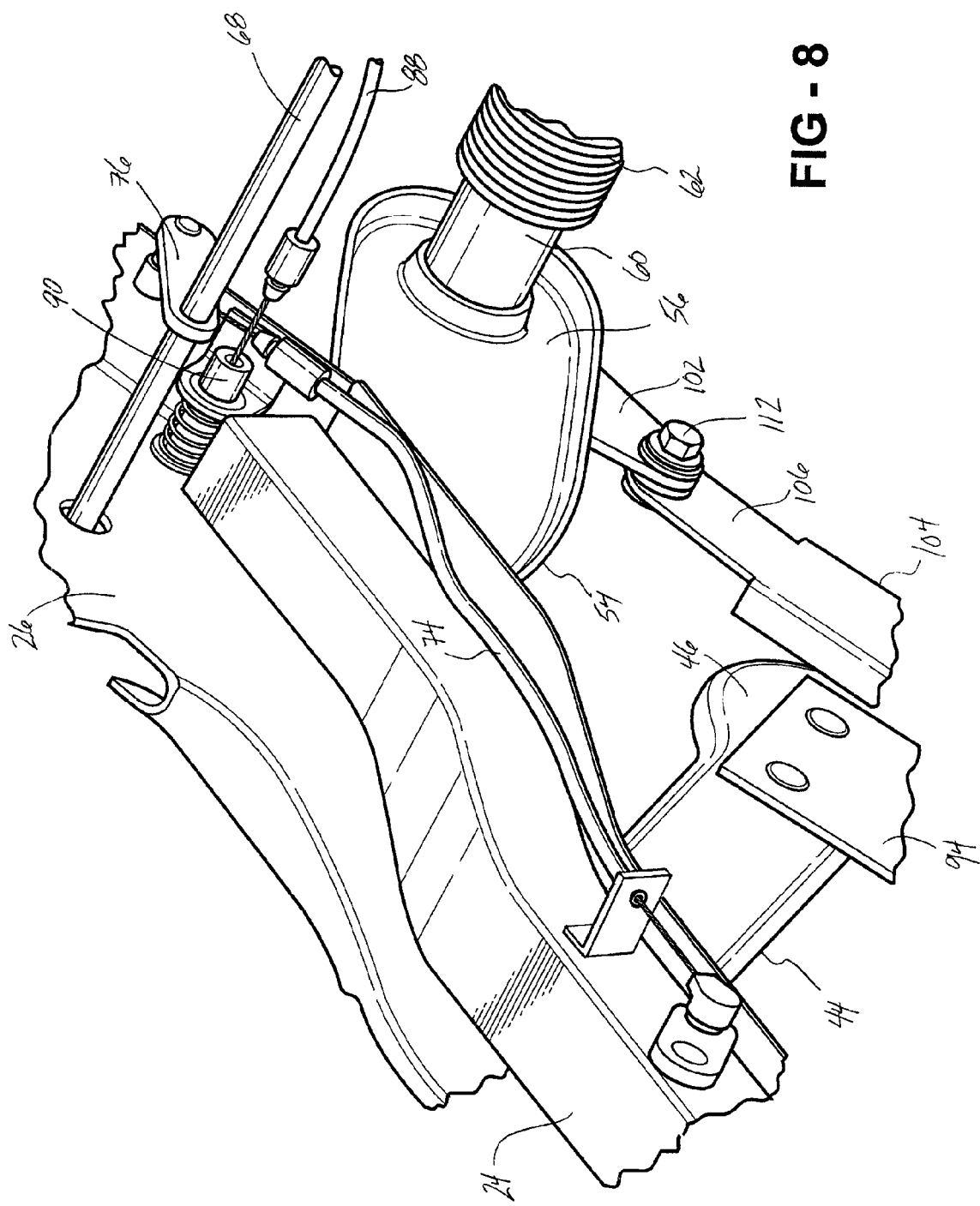
FIG. 8 is an enlarged, fragmentary perspective view of the seat assembly illustrating a retractable spring-biased pin.

A side handle 70, pivotally mounted to one side of the seat cushion 12, shown in FIG. 1, and a rear handle 72, pivotally mounted to the seat back 16, shown in FIG. 2, are both operatively coupled to the lower cross-talk tube 68 for actuating the seat adjustment mechanisms 66 between the locked and unlocked states. Referring to FIG. 8, a first Bowden-type cable 74 extends between the side handle 70 and a link lever 76 fixedly secured to the lower cross-talk tube 68. Actuation of the side handle 70 pulls the first cable 74 such that the link lever 76 pivots forward causing the lower cross-talk tube 68 to rotate thereby actuating the seat adjustment mechanisms 66 to the unlocked state.

Figure 9:
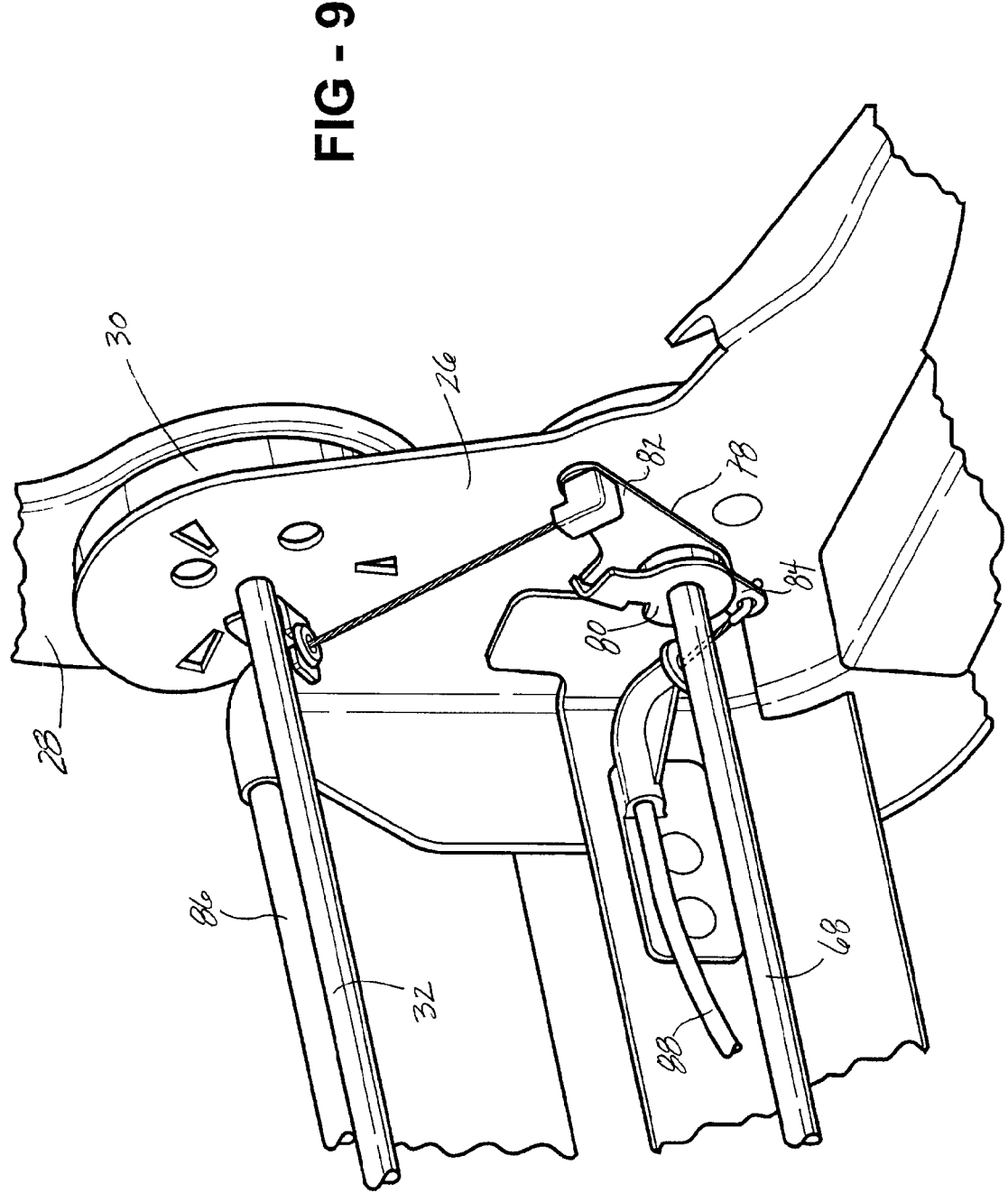
FIG. 9 is an enlarged, fragmentary perspective view of the seat assembly illustrating a pivot link engaging a fixed link.

Referring to FIG. 9, a pivot link 78 is pivotally coupled about the lower cross-talk tube 68 adjacent a fixed link 80 fixedly secured to the lower cross-talk tube 68. The pivot link 78 extends between an upper end 82 and a lower end 84. The upper end 82 of the pivot link 78 pushes against the fixed link 80 when the upper end 82 pivots rearward, thus causing the lower cross-talk tube 68 to rotate. A second Bowden-type cable 86 extends between the rear handle 72 and the upper end 82 of the pivot link 78. Actuation of the rear handle 72 pulls the second cable 86 such that the upper end 82 of the pivot link 78 pivots rearward about the lower cross-talk tube 68 and pushes against the fixed link 80 which rotates the lower cross-talk tube 68, actuating the seat adjustment mechanisms 66 to the unlocked state.

Referring to FIGS. 8 and 9, a third Bowden-type cable 88 extends between the lower end 84 of the pivot link 78 and a rear pin 90 operatively mounted through an aperture (not shown) in one of the seat cushion brackets 26. The rear pin 90 is spring biased such that it normally extends laterally outward from the seat cushion bracket 26. When the second cable 86 pulls the upper end 82 of the pivot link 78 rearward, the lower end 84 pivots forward pulling the third cable 88, which retracts the rear pin 90 inward. Alternatively, when the first cable 74 pulls the link lever 76 to rotate the lower cross-talk tube 68, the fixed link 80 rotates away from the pivot link 78 such that the pivot link 78 does not pivot, and thus, the third cable 88 is not pulled to retract the rear pin 90.

Figure 10:
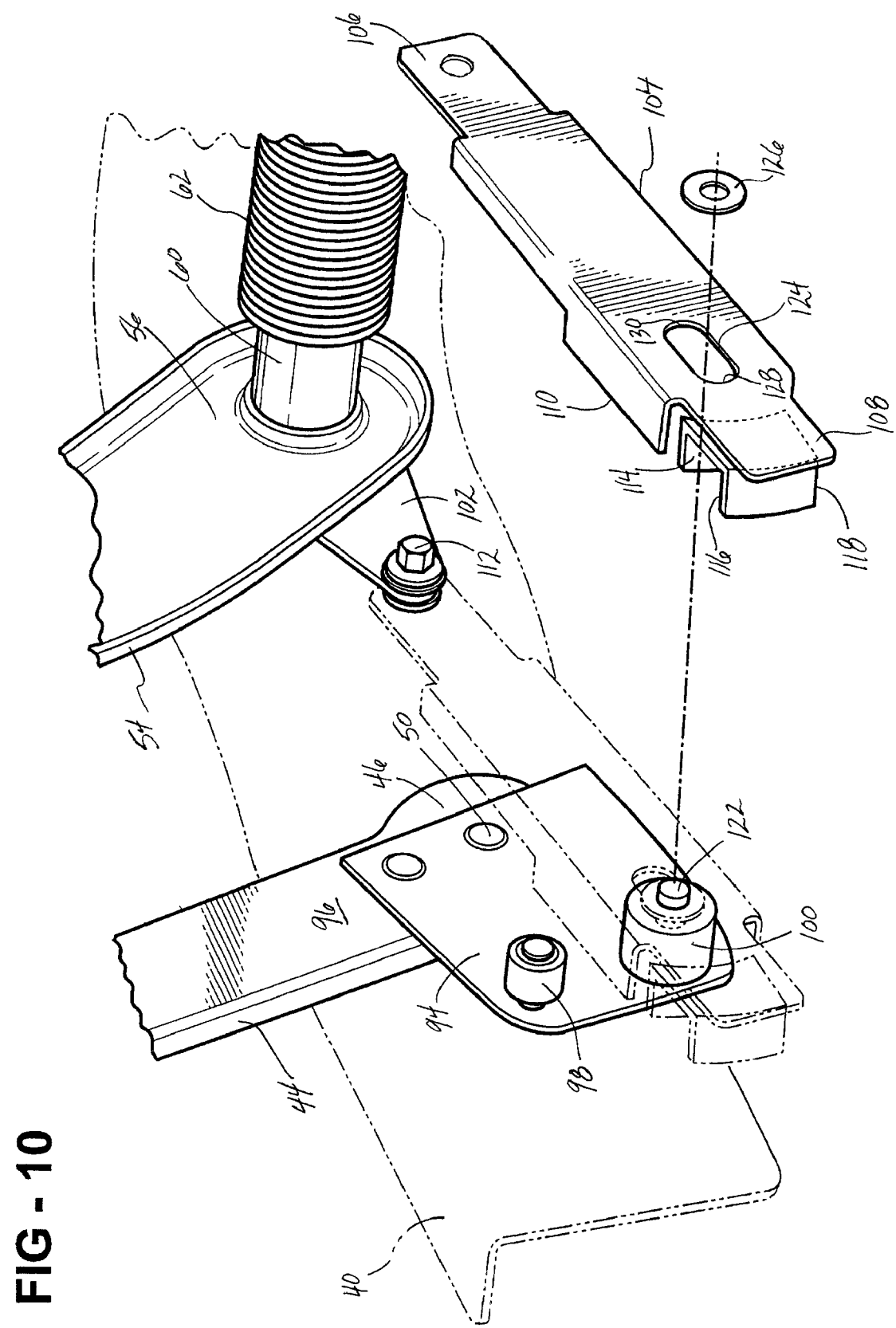
FIG. 10 is an enlarged, partially exploded perspective view of a guide link and roller.
Figure 11:
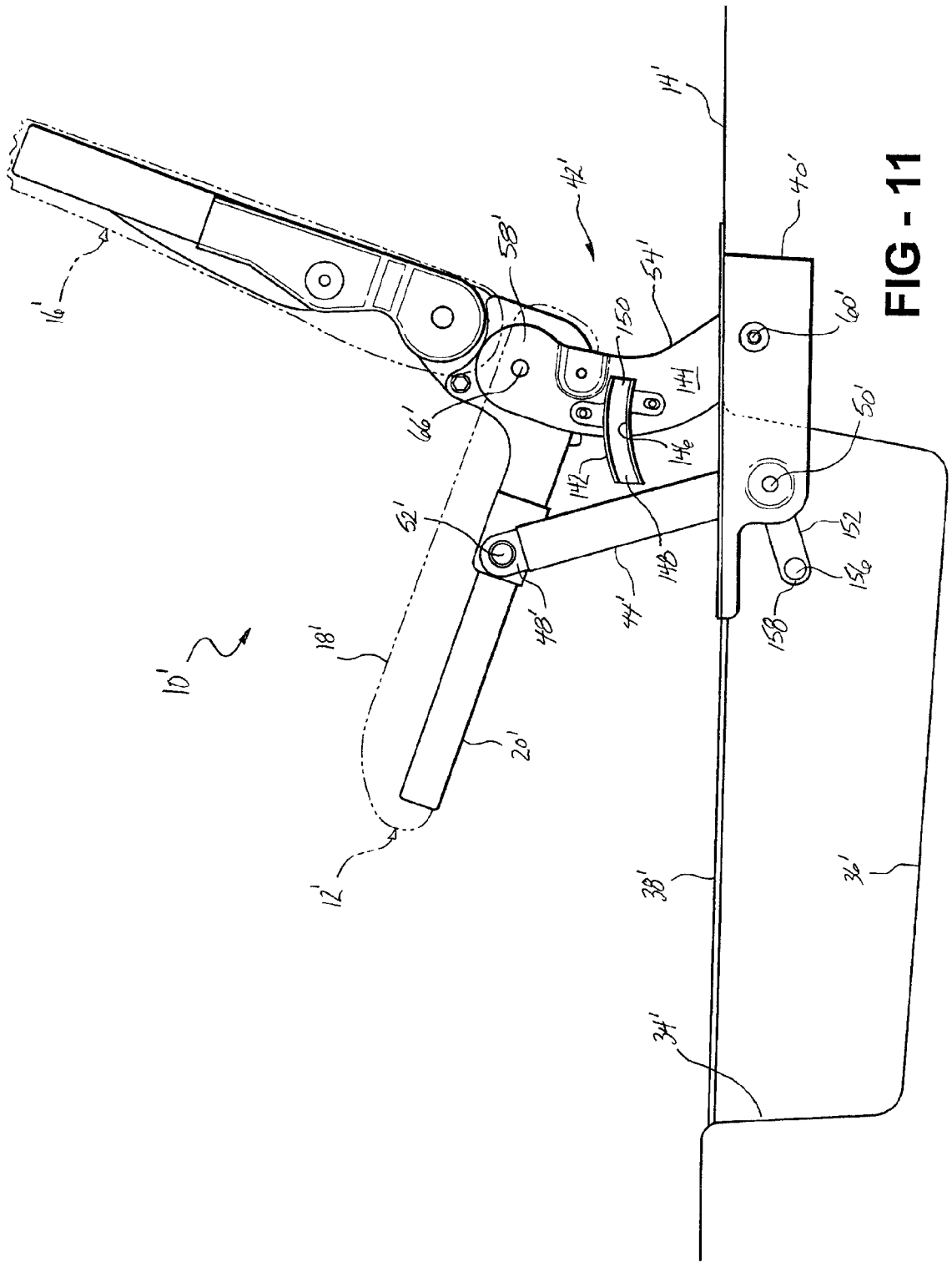
FIG. 11 is a side view of a second embodiment of the seat assembly in the full forward seating position.
Figure 12:
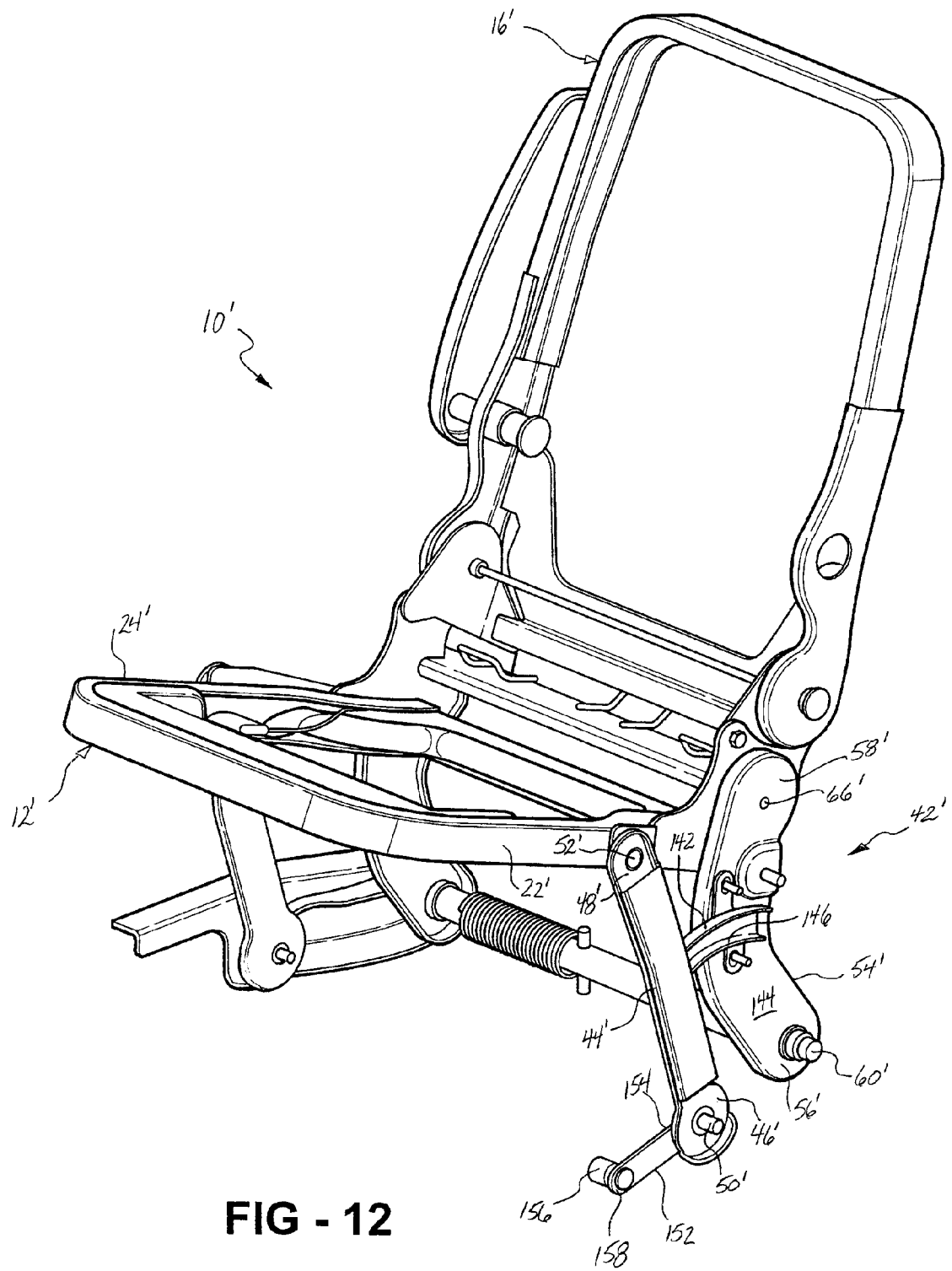
FIG. 12 is a front, left-side perspective view of the second embodiment of the seat assembly in the full forward seating position.
Figure 13:
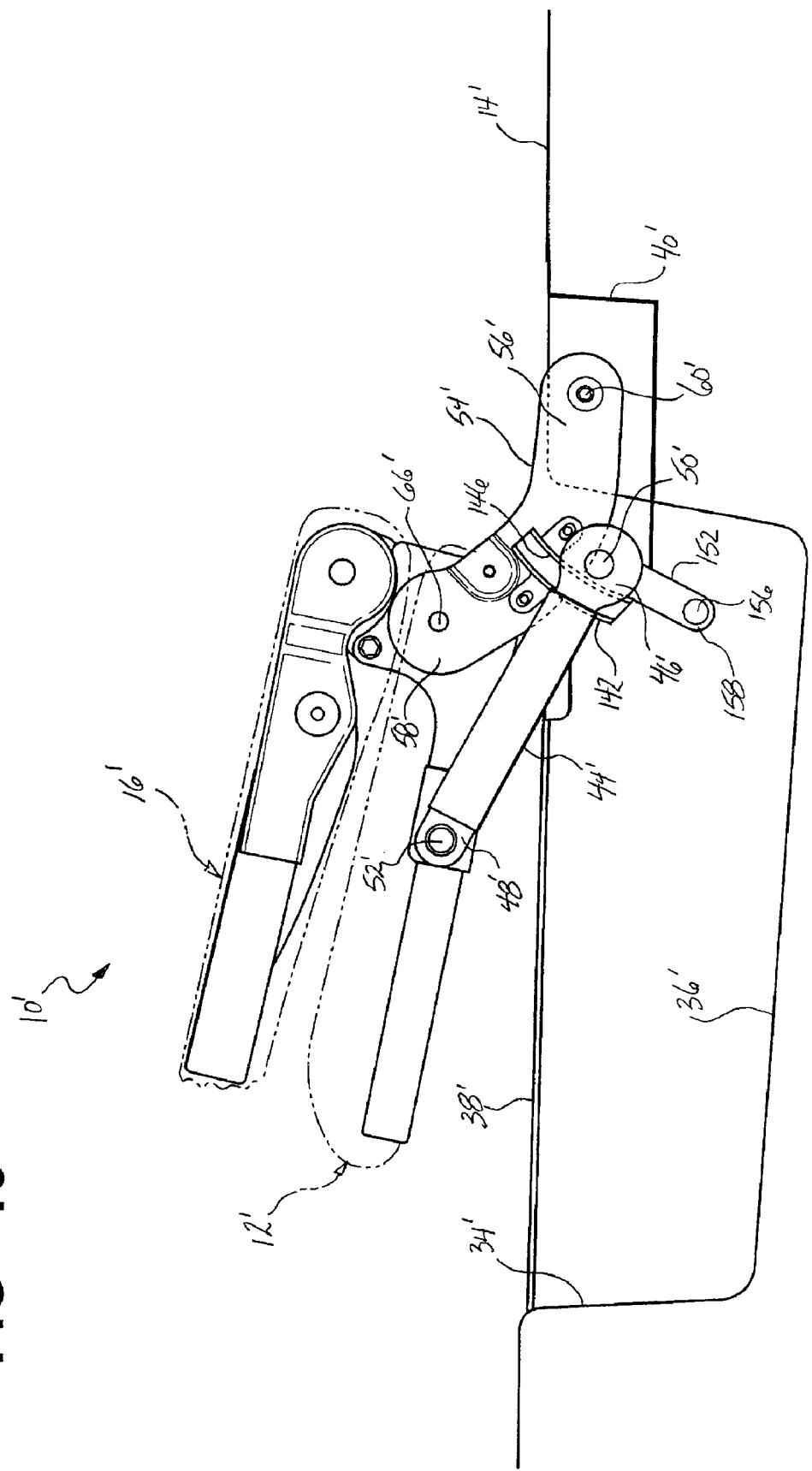
FIG. 13 is a side view of the second embodiment of the seat assembly in the easy-entry position.

Referring to FIG. 10, a guide bracket 94 is fixedly secured to an inner surface 96 of one of the front legs 44 such that it pivots therewith about pivot 50. An upper roller 98 and a lower roller 100 extend laterally out from the guide bracket 94. The upper 98 and lower 100 rollers are rotatably coupled to the guide bracket 94.

A link bracket 102 is fixedly mounted to the lower end 56 of the rear leg 54 on the same side of the seat assembly 10 as the front leg 44 having the guide bracket 94 fixedly mounted thereto. A guide link 104 includes a first end 106, a second end 108, and a guide track 110 extending therebetween. The first end 106 of the guide link 104 is pivotally coupled to the link bracket 102 at pivot 112. The second end 108 includes a generally arcuate channel 114 extending between a first end 116 and a second end 118. The guide track 110 extending between the first 106 and second 108 ends is generally C-shaped for receiving the lower roller 100 therein. The lower roller 100 rollingly engages the guide track 110 and has a roller shaft 122 which is slidably coupled to a slot 124 in the guide link 104 and secured thereto by a retaining washer 126. The slot 124 extends between a first end 128 and a second end 130.

Figure 6:
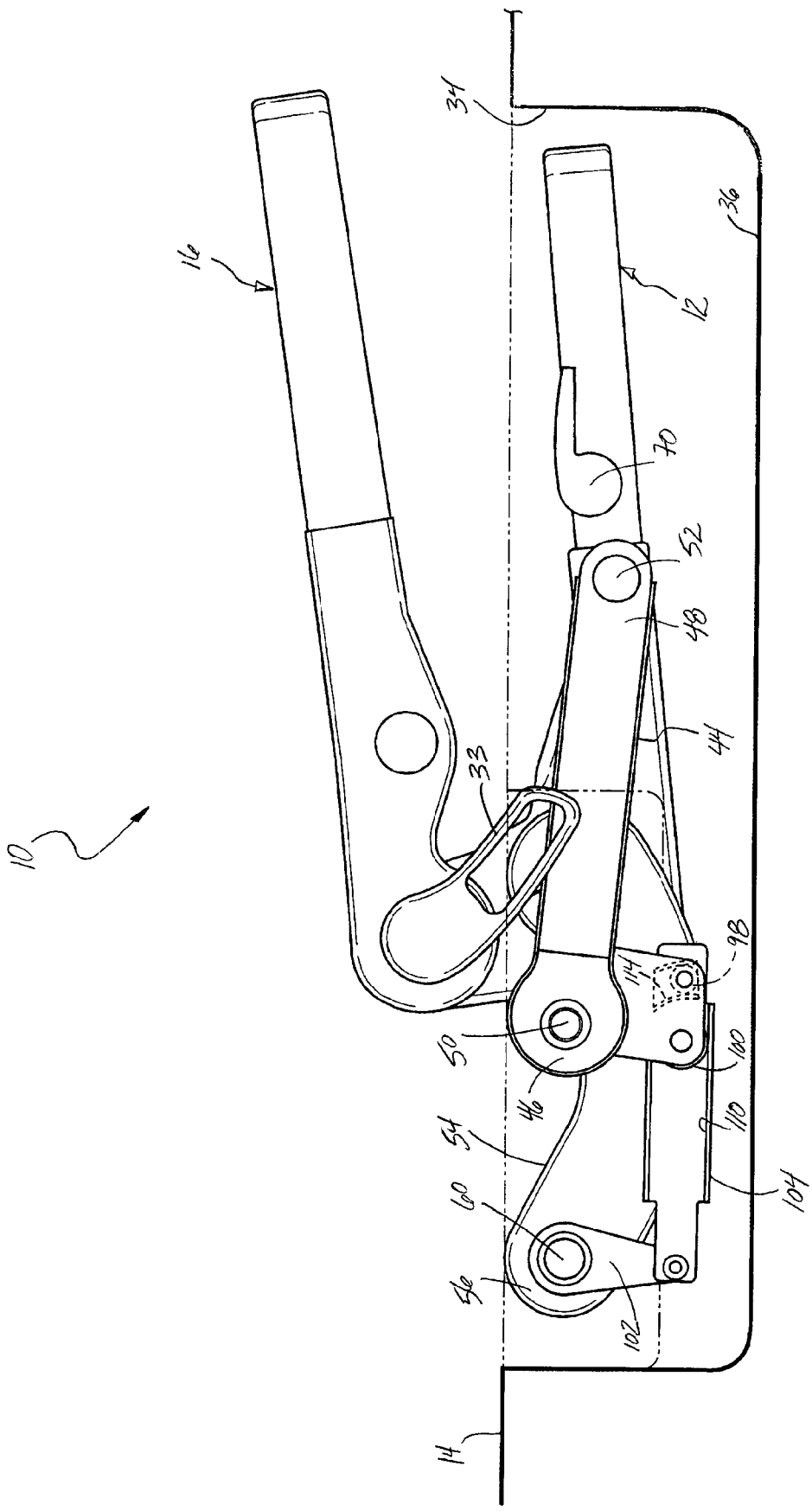
FIG. 6 is a side view of the seat assembly illustrating a riser mechanism in an on-center condition.

When the seat assembly 10 is in the full rearward seating position, the lower roller 100 is positioned in the guide track 110 such that the roller shaft 122 is located at the first end 128 of the slot 124. As the seat assembly 10 moves from the full rearward seating position to the full forward seating position, the lower roller 100 rolls rearward within the guide track 110 such that the roller shaft 122 moves toward the second end 130 of the slot 124. The riser mechanism 42 reaches an on-center position, shown in FIG. 6, as the seat assembly 10 moves from the full forward seating position toward the stowed position. The riser mechanism 42 is in the on-center condition when pivot points 50, 52, 60, 66 are linearly aligned. It will be appreciated that when the riser mechanism 42 is in the on-center condition, the front 44 and rear 54 legs can pivot in opposite directions. For example, referring to FIG. 6, the front leg 44 can pivot in a clockwise direction while the rear leg 54 pivots in a counterclockwise direction, resulting in the seat cushion 12 tilting downward and forward.

Alternatively, the front leg 44 can pivot in the counterclockwise direction while the rear leg 54 pivots in the clockwise direction, resulting in the seat cushion 12 tilting upward and rearward. In either case, the seat assembly 10 will not move into the stowed position.

To prevent this, the guide link 104 receives the upper roller 98 within the arcuate channel 114 prior to the riser mechanism 42 reaching the on-center condition thereby creating a fixed link between the lower ends 46, 56 of the front 44 and rear 54 legs forcing them to pivot together in the same direction as the riser mechanism 42 passes through the on-center condition. More specifically, as the riser mechanism 42 approaches the on-center condition, the lower roller 100 is positioned such that the roller shaft 122 is located at the second end 130 of the slot 124 allowing the upper roller 98 to enter the first end 116 of the arcuate channel 114 thereby creating the fixed link between the lower ends 46, 56 of the front 44 and rear 54 legs. Therefore, clockwise rotation (when viewed from FIG. 5) of the rear leg 54 and link bracket 102 cause the guide link 104 to move in a rearward direction such that the arcuate channel 114 abuts the upper roller 98. The resulting force applied to the upper roller 98 causes the front leg 44 to pivot together with the rear leg 54 in the clockwise direction while the upper roller 98 travels along the arcuate channel 114 toward the second end 118.

Figure 4:
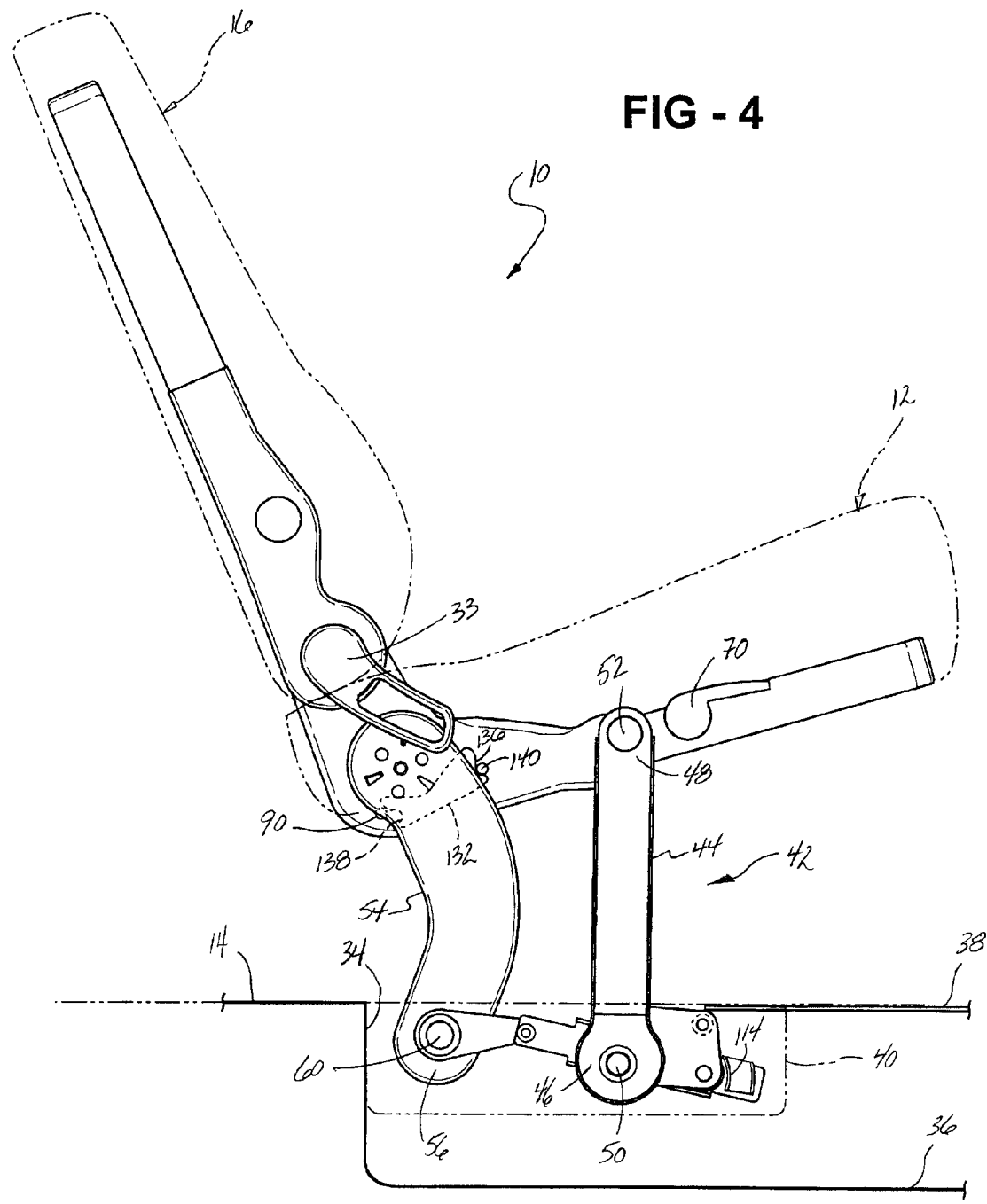
FIG. 4 is a side view of the seat assembly in a full rearward seating position.

Referring to FIGS. 1 and 4, the seat assembly 10 also includes a locking plate 132 on the same side of the seat assembly 10 as the rear pin 90. The locking plate 132 is fixedly secured to an inboard surface 134 at the upper end 58 of the rear leg 54. The locking plate 132 has a forward slot 136 and a rearward slot 138. Actuation of the side handle 70 rotates the lower cross-talk tube 68 so that the seat adjustment mechanisms 66 are unlocked allowing the seat assembly 10 to move forward and rearward. The forward slot 136 abuts a front pin 140 fixedly secured to the seat cushion bracket 26 when the seat assembly 10 is in the full rearward seating position, as shown in FIG. 4. The rearward slot 138 abuts the rear pin 90 when the seat assembly 10 is in the full forward seating position, as shown in FIG. 1. Thus, fore and aft adjustment of the seat assembly 10 is provided by actuating the side handle 70. In addition, contact between the locking plate 132 and the rear pin 90 prevents the seat assembly 10 from inadvertently moving into one of the easy-entry and stowed positions during fore and aft adjustment.

Actuation of the rear handle 72 rotates the lower cross-talk tube 68 so that the seat adjustment mechanisms 66 are unlocked and retracts the rear pin 90 to allow the seat assembly 10 to move into one of the easy-entry and stowed positions. Whether the seat assembly 10 moves into the easy-entry or stowed position depends upon the presence or absence of the floor panel 38.

Figure 5:
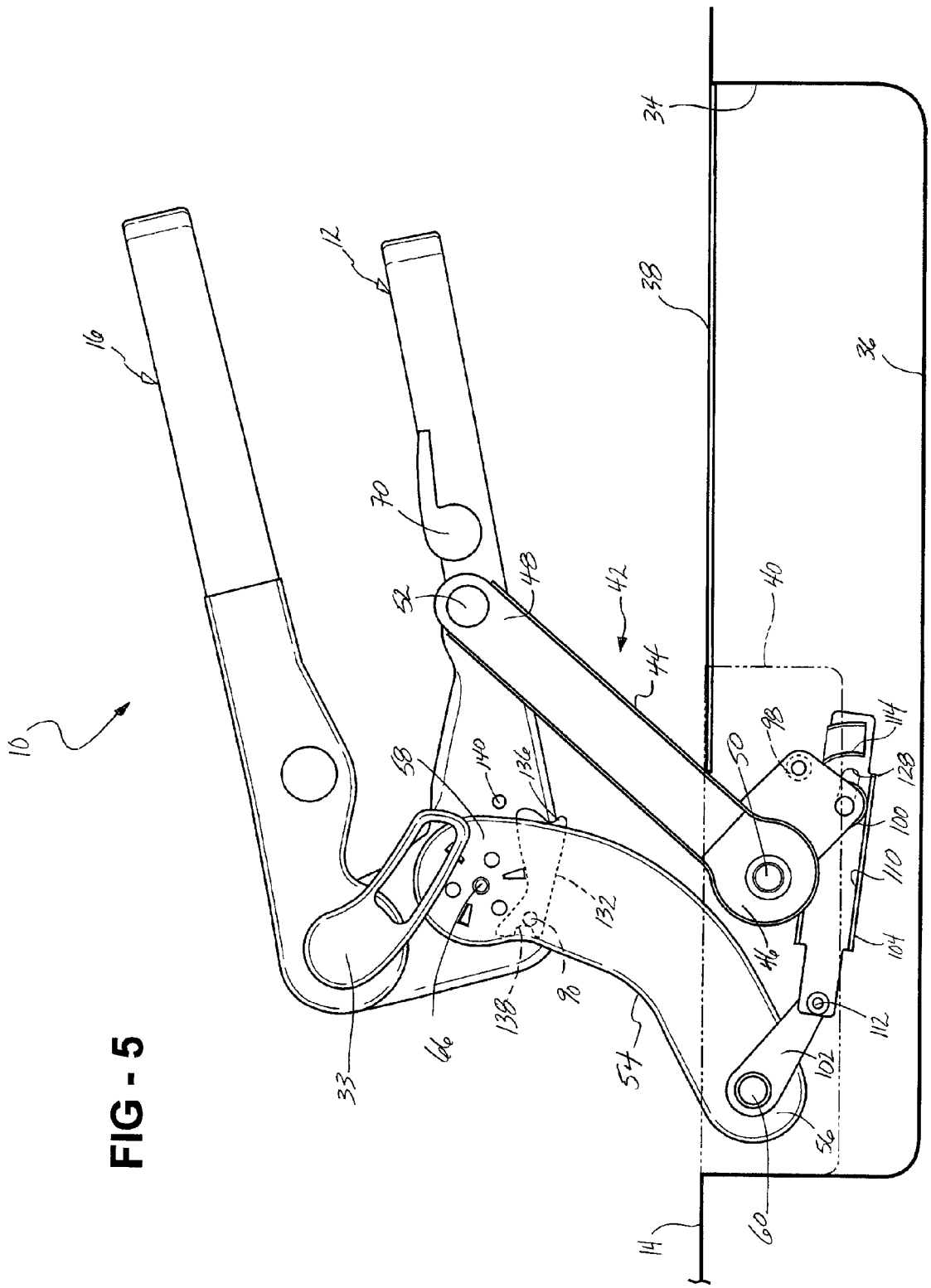
FIG. 5 is a side view of the seat assembly in an easy-entry position.
Figure 7:
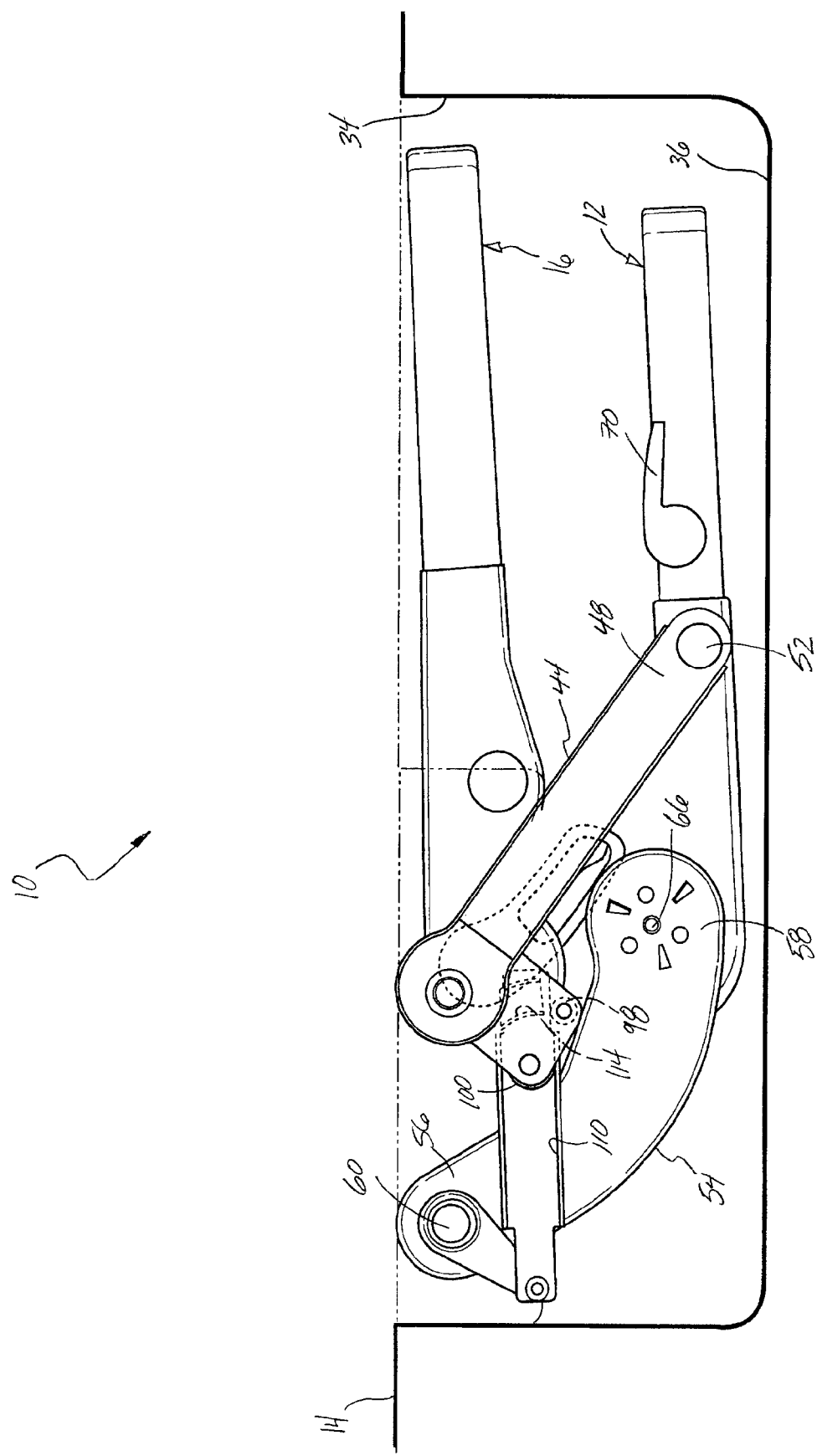
FIG. 7 is a side view of the seat assembly in a stowed position within a recess formed in a floor.

When the floor panel 38 is present, the front 44 and rear 54 legs will pivot forward until the front legs 44 abut the floor panel 38 and the seat assembly 10 is in the easy-entry position, as shown in FIG. 5. On the other hand, when the floor panel 38 has been removed, the front 44 and rear 54 legs will pivot forward until the seat assembly 10 is in the stowed position. In the stowed position, the seat cushion 12 and seat back 16 are disposed within the recess 34 formed in the floor 14 with the bottom surface 20 of the seat cushion 12 adjacent the recess bottom floor 36, as shown in FIG. 7. The seat adjustment mechanisms 66 actuate to the locked state when the seat assembly 10 is in the stowed position to maintain the seat assembly 10 in the stowed position.

In operation, starting with the seat assembly 10 in the full forward seating position, as shown in FIG. 1, actuation of the side handle 70 pulls the first cable 74 which pulls the link lever 76 forward, causing the lower cross-talk tube 68 to rotate in a clockwise direction when viewed from FIG. 8. The rotation of the lower cross-talk tube 68 actuates the seat adjustment mechanisms 66 to the unlocked state allowing the front 44 and rear 54 legs to pivot about pivots 50 and rod 60, respectively. At this time, the seat assembly 10 can move to any of the plurality of seating positions including the full forward seating position, in which the rearward slot 138 of the locking plate 132 abuts the rear pin 90, as shown in FIG. 1, and the full rearward seating position, in which the forward slot 136 of the locking plate 132 abuts the front pin 140, as shown in FIG. 4. When the seat assembly 10 is in the desired position, releasing the side handle 70 actuates the seat adjustment mechanisms 66 to the locked state to prevent further fore and aft movement of the seat assembly 10.

Once again, starting with the seat assembly 10 in the full forward seating position, as shown in FIG. 1, the rearward slot 138 of the locking plate 132 abuts the rear pin 90. When it is desired to move the seat assembly 10 into one of the easy-entry and stowed positions, the seat back recliner handle 33 is actuated to rotate the upper cross-talk tube 32. Rotation of the upper cross-talk tube 32 actuates the seat back recliner mechanisms 30 to the unlocked state allowing the seat back 16 to pivot into the forwardly folded flat position overlying the seating surface 18 of the seat cushion 12.

Next, actuation of the rear handle 72 pulls the second cable 86 which pulls the upper end 82 of the pivot link 78 rearward such that the upper end 82 pushes against the fixed link 80, causing the lower cross-talk tube 68 to rotate in a counterclockwise direction when viewed from FIG. 9. The rotation of the lower cross-talk tube 68 actuates the seat adjustment mechanisms 66 to the unlocked state. At the same time, the lower end 84 of the pivot link 78 pivots forward pulling the third cable 88, which causes the rear pin 90 to retract inward to allow the front 44 and rear 54 legs to pivot about pivots 50 and rod 60, respectively, forwardly toward the floor 14.

The presence or absence of the floor panel 38 will determine the end position of the seat assembly 10 upon actuation of the rear handle 72. If the floor panel 38 is covering the recess 34, the front 44 and rear 54 legs will pivot in the clockwise direction (when viewed from FIG. 1) about pivots 50 and rod 60, respectively, until the front legs 44 abut the floor panel 38. In this position, the seat assembly 10 is in the easy-entry position, as shown in FIG. 5.

If, however, the floor panel 38 has been removed prior to actuation of the rear handle 72, the front 44 and rear 54 legs will pivot in the clockwise direction (when viewed from FIG. 1) about pivots 50 and rod 60, respectively, until the seat assembly 10 is in the stowed position, as shown in FIG. 7. More specifically, as the seat assembly 10 moves toward the stowed position and the riser mechanism 42 approaches the on-center condition, the upper roller 98 enters the first end 116 of the arcuate channel 114 thereby creating the fixed link between the lower ends 46, 56 of the front 44 and rear 54 legs. The rear leg 54 and link bracket 102 continue to rotate in the clockwise direction causing the guide link 104 to move rearward. The rearward movement of the guide link 104 causes the arcuate channel 114 to act on the upper roller 98 as the upper roller 98 travels along the arcuate channel 114 from the first end 116 to the second end 118 such that the front 44 and rear 54 legs pivot in the clockwise direction as the riser mechanism 42 passes through the on-center condition. The front 44 and rear 54 legs continue to pivot in the clockwise direction until the seat assembly 10 is in the stowed position disposed within the recess 34 in the floor 14. The seat adjustment mechanisms 66 actuate to the locked state to maintain the seat assembly 10 in the stowed position. Finally, the floor panel 38 can be replaced to cover the seat assembly 10 in the recess 34 formed in the floor 14.

To return the seat assembly 10 to the full forward seating position, the floor panel 38 is removed to provide access to the seat assembly 10. Next, the rear handle 72 is actuated pulling the second cable 86 which pulls the upper end 82 of the pivot link 78 rearward such that the upper end 82 pushes against the fixed link 80, causing the lower cross-talk tube 68 to rotate. The rotation of the lower cross-talk tube 68 actuates the seat adjustment mechanisms 66 to the unlocked state allowing the springs 62 to bias the seat assembly 10 upward. The seat assembly 10 is lifted such that the front 44 and rear 54 legs pivot in the counterclockwise direction (when viewed from FIG. 7) about pivots 50 and rod 60, respectively.

Similar to that described above, as the seat assembly 10 is lifted and the riser mechanism 42 approaches the on-center condition, the upper roller 98 enters the second end 118 of the arcuate channel 114 thereby creating the fixed link between the lower ends 46, 56 of the front 44 and rear 54 legs. The rear leg 54 and link bracket 102 continue to rotate in the counterclockwise direction causing the guide link 104 to move forward. The forward movement of the guide link 104 causes the arcuate channel 114 to act on the upper roller 98 as the upper roller 98 travels along the arcuate channel 114 from the second end 118 to the first end 116 such that the front 44 and rear 54 legs pivot in the counterclockwise direction as the riser mechanism 42 passes through the on-center condition. The front 44 and rear 54 legs continue to pivot in the counterclockwise direction until the seat assembly 10 is in the full forward seating position, as shown in FIG. 1. Once the seat assembly 10 reaches the full forward seating position, the rear pin 90 extends outward from the seat cushion bracket 26 and abuts the rearward slot 138 of the locking plate 132. Finally, the seat back recliner handle 33 is actuated to rotate the upper cross-talk tube 32. Rotation of the upper cross-talk tube 32 actuates the seat back recliner mechanisms 30 to the unlocked state allowing the seat back 16 to pivot into one of the plurality of reclined seating positions.

Figure 14:
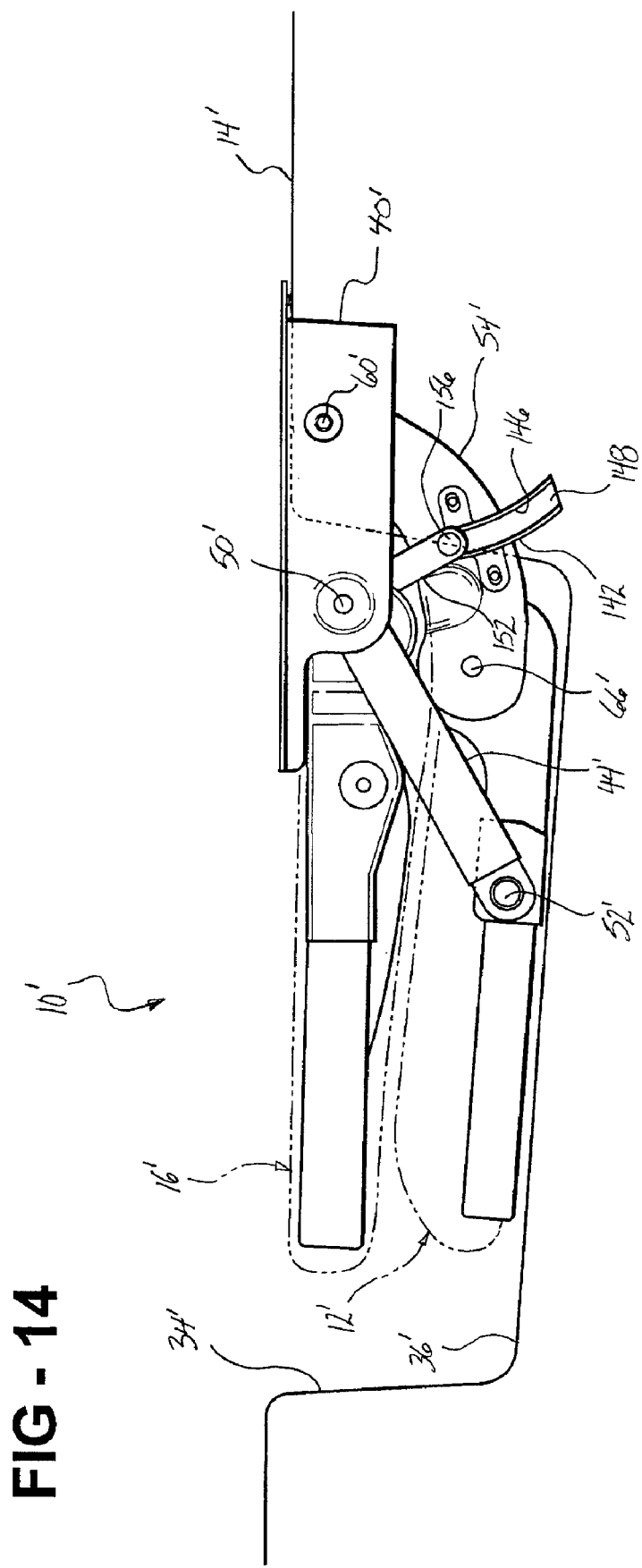
FIG. 14 is a side view of the second embodiment of the seat assembly in the stowed position within the recess formed in the floor.

Referring to FIGS. 11 through 14, wherein like primed reference numerals represent similar elements as those described above, in a second embodiment of the invention a seat assembly 10' includes a guide member 142 fixedly mounted along an outboard surface 144 of at least one of the rear legs 54'. The guide member 142 includes a generally arcuate channel 146 extending between a first end 148 and a second end 150. A lower link 152 is fixedly secured at a proximal end 154 to the lower end 46' of the front leg 44' on the same side of the seat assembly 10' as the rear leg 54' having the guide member 142 fixedly mounted thereto. The lower link 152 pivots with the front leg 44' about pivot 50'. A roller 156 extends laterally out from a distal end 158 of the lower link 152. The guide member 142 receives the roller 156 within the arcuate channel 146 as the seat assembly 10' moves toward the stowed position and the riser mechanism 42' approaches the on-center condition, forcing the front 44' and rear 54' legs to pivot together in the same direction, as the riser mechanism passes through the on-center condition. More specifically, as the riser mechanism 42' approaches the on-center condition, the roller 156 enters the first end 148 of the arcuate channel 146. Therefore, counterclockwise rotation (when viewed from FIG. 13) of the rear leg 54' causes the guide member 142 and therefore the arcuate channel 146 to act on the roller 156 such that the front 44' and rear 54' legs pivot together in the counterclockwise direction while the roller 156 travels along the arcuate channel 146 toward the second end 150. The front 44' and rear 54' legs continue to pivot in the counterclockwise direction until the seat assembly 10' is in the stowed position disposed within the recess 34' in the floor 14', as shown in FIG. 14.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A seat assembly for supporting an occupant in an automotive vehicle above a floor having a recess, said seat assembly comprising:
   a seat cushion;
   a seat back pivotally coupled to said seat cushion, said seat back selectively moveable between a plurality of reclined seating positions and a forwardly folded flat position overlying said seat cushion;
   a riser mechanism including at least one front leg and at least one rear leg, each of said front and rear legs extending between a lower end adapted to be pivotally coupled to the floor and an upper end pivotally coupled to said seat cushion, wherein said front and rear legs are offset laterally such that they rotate in different planes;
   a seat adjustment mechanism disposed between said seat cushion and said upper end of said rear leg, said seat adjustment mechanism operable between a locked state and an unlocked state allowing said front and rear legs to pivot about said lower end of said front and rear legs while said seat cushion pivots about said upper end of said front and rear legs thereby moving said seat assembly between a seating position with said seat cushion spaced above the floor and a stowed position with said seat cushion and seat back disposed in the recess in the floor; and
   an arcuate channel operatively coupled to said rear leg for selectively receiving a laterally extending guide pin mounted to said front leg for operatively coupling said front and rear legs to rotate together as said seat assembly moves between said seating and stowed positions.

2. A seat assembly as set forth in claim 1 including a guide link extending between a first end adapted to be pivotally coupled to said lower end of said rear leg and a second end adapted to be pivotally and slidably coupled to said lower end of said front leg, wherein said second end includes said arcuate channel for selectively receiving said laterally extending guide pin mounted to said lower end of said front leg for operatively coupling said lower end of said front and rear legs to rotate together as said seat assembly moves between said seating and stowed positions.

3. A seat assembly as set forth in claim 2 wherein said laterally extending guide pin is a roller rotatably coupled to said lower end of said front leg.

4. A seat assembly as set forth in claim 3 including a bracket having an upper roller defining said guide pin and a lower roller each rotatably coupled to said bracket and extending laterally therefrom, said bracket fixedly secured to said lower end of said front leg for pivoting therewith.

5. A seat assembly as set forth in claim 4 wherein said guide link includes a guide track extending between said first and second ends, said lower roller rollingly engaging said guide track.

6. A seat assembly as set forth in claim 5 wherein said arcuate channel selectively receives said upper roller for operatively coupling said lower end of said front and rear legs to rotate together as said riser mechanism passes through an on-center condition wherein said upper and lower ends of said front and rear legs are linearly aligned.

7. A seat assembly as set forth in claim 6 including a rear pin operatively coupled to said seat cushion adjacent said upper end of said rear leg, said rear pin selectively moveable between an extended position protruding laterally outward from said seat cushion for engagement with said rear leg and a retracted position.

8. A seat assembly as set forth in claim 7 including a front pin disposed forward and upward of said rear pin, said front pin fixedly secured to said seat cushion and protruding laterally therefrom for engagement with said rear leg.

9. A seat assembly as set forth in claim 8 wherein said seat adjustment mechanism unlocks to said unlocked state allowing said front and rear legs to pivot about said lower ends while said seat cushion pivots about said upper ends thereby moving said seat assembly between a full rearward seating position wherein said upper end of said rear leg abuts said front pin and a full forward seating position wherein said upper end of said rear leg abuts said rear pin, said seat adjustment mechanism lockable in said locked state at any of a plurality of seating positions between and including said full forward and full rearward seating positions.

10. A seat assembly as set forth in claim 9 including a plate fixedly secured to said upper end of said rear leg for abutting said front pin when said seat assembly is in said full rearward seating position and abutting said rear pin when said seat assembly is in said full forward seating position.

11. A seat assembly as set forth in claim 10 wherein said plate includes a forward slot for abutting said front pin and a rearward slot for abutting said rear pin.

12. A seat assembly as set forth in claim 11 including a first handle operatively coupled to said seat adjustment mechanism for actuating said seat adjustment mechanism between said locked and unlocked states.

13. A seat assembly as set forth in claim 12 including a second handle operatively coupled to said seat adjustment mechanism for actuating said seat adjustment mechanism between said locked and unlocked states, and operatively coupled to said rear pin for actuating said rear pin between said extended position when said seat adjustment mechanism is in said locked state and said retracted position when said seat adjustment mechanism is in said unlocked state thereby allowing selective movement of said seat assembly between any of said plurality of seating positions and said stowed position.

14. A seat assembly as set forth in claim 13 including a floor panel covering the recess in the floor, said floor panel selectively movable between a closed position covering the recess and an open position allowing access for stowing or removing said seat assembly.

15. A seat assembly as set forth in claim 14 wherein said seat assembly is selectively moveable between any of said plurality of seating positions and an easy-entry position, forward and downward of said full forward seating position, whereat said front leg abuts said floor panel in said closed position.

16. A seat assembly as set forth in claim 15 including a seat back recliner mechanism disposed between said seat back and seat cushion, said seat back recliner mechanism operable between a locked state and an unlocked state allowing said movement of said seat back between said plurality of reclined seating positions and said forwardly folded flat position.

17. A seat assembly as set forth in claim 1 including a lower link extending between a proximal end fixedly secured to said lower end of said front leg for pivoting therewith and a distal end having said guide pin coupled thereto and extending laterally therefrom.

18. A seat assembly as set forth in claim 17 wherein said laterally extending guide pin is a roller rotatably coupled to said distal end of said lower link.

19. A seat assembly as set forth in claim 18 wherein said arcuate channel selectively receives said roller for operatively coupling said front and rear legs to rotate together as said riser mechanism passes through said on-center condition.

20. A seat assembly for supporting an occupant in an automotive vehicle above a floor having a recess, said seat assembly comprising:
a seat cushion;
a seat back pivotally coupled to said seat cushion, said seat back selectively moveable between a plurality of reclined seating positions and a forwardly folded flat position overlying said seat cushion;
a riser mechanism including at least one front leg and at least one rear leg, each of said front and rear legs extending between a lower end adapted to be pivotally coupled to the floor and an upper end pivotally coupled to said seat cushion, wherein said front and rear legs are offset laterally such that they rotate in different planes;
a rear pin operatively coupled to said seat cushion adjacent said upper end of said rear leg, said rear pin selectively moveable between an extended position protruding laterally outward from said seat cushion for engagement with said rear leg and a retracted position; and
a seat adjustment mechanism disposed between said seat cushion and said upper end of said rear leg, said seat adjustment mechanism operable between a locked state and an unlocked state allowing said front and rear legs to pivot about said lower end of said front and rear legs while said seat cushion pivots about said upper end of said front and rear legs thereby moving said seat assembly between a seating position with said seat cushion spaced above the floor and a stowed position with said seat cushion and seat back disposed in the recess in the floor.

21. A seat assembly as set forth in claim 20 including a front pin disposed forward and upward of said rear pin, said front pin fixedly secured to said seat cushion and protruding laterally therefrom for engagement with said rear leg.

22. A seat assembly as set forth in claim 21 wherein said seat adjustment mechanism unlocks to said unlocked state allowing said front and rear legs to pivot about said lower end of said front and rear legs while said seat cushion pivots about said upper end of said front and rear legs thereby moving said seat assembly between a full rearward seating position wherein said upper end of said rear leg abuts said front pin and a full forward seating position wherein said upper end of said rear leg abuts said rear pin, said seat adjustment mechanism lockable in said locked state at any of a plurality of seating positions between and including said full forward and full rearward seating positions.

23. A seat assembly as set forth in claim 22 including a plate fixedly secured to said upper end of said rear leg for abutting said front pin when said seat assembly is in said full rearward seating position and abutting said rear pin when said seat assembly is in said full forward seating position.

24. A seat assembly as set forth in claim 23 wherein said plate includes a forward slot for abutting said front pin and a rearward slot for abutting said rear pin.

25. A seat assembly as set forth in claim 24 including a first handle operatively coupled to said seat adjustment mechanism for actuating said seat adjustment mechanism between said locked and unlocked states.

26. A seat assembly as set forth in claim 25 including a second handle operatively coupled to said seat adjustment mechanism for actuating said seat adjustment mechanism between said locked and unlocked states, and operatively coupled to said rear pin for actuating said rear pin between said extended position when said seat adjustment mechanism is in said locked state and said retracted position when said seat adjustment mechanism is in said unlocked state thereby allowing selective movement of said seat assembly between any of said plurality of seating positions and said stowed position.

27. A seat assembly as set forth in claim 26 including a floor panel covering the recess in the floor, said floor panel selectively movable between a closed position covering the recess and an open position allowing access for stowing or removing said seat assembly.

28. A seat assembly as set forth in claim 27 wherein said seat assembly is selectively moveable between any of said plurality of seating positions and an easy-entry position, forward and downward of said full forward seating position, whereat said front leg abuts said floor panel in said closed position.

29. A seat assembly as set forth in claim 28 including a seat back recliner mechanism disposed between said seat back and seat cushion, said seat back recliner mechanism operable between a locked state and an unlocked state allowing said movement of said seat back between said plurality of reclined seating positions and said forwardly folded flat position.

30. A seat assembly for supporting an occupant in an automotive vehicle above a floor having a recess, said seat assembly comprising:

a seat cushion;

a seat back pivotally coupled to said seat cushion, said seat back selectively moveable between a plurality of reclined seating positions and a forwardly folded flat position overlying said seat cushion;

a riser mechanism including at least one front leg and at least one rear leg, each of said front and rear legs extending between a lower end adapted to be pivotally coupled to the floor and an upper end pivotally coupled to said seat cushion;

a front pin fixedly secured to said cushion and protruding laterally therefrom;

a rear pin disposed rearward and downward of said front pin, said rearward pin fixedly secured to said cushion and protruding laterally therefrom; and a seat adjustment mechanism disposed between said seat cushion and said upper end of said rear leg, said seat adjustment mechanism operable between a locked state and an unlocked state allowing said front and rear legs to pivot about said lower end of said front and rear legs while said seat cushion pivots about said upper end of said front and rear legs thereby moving said seat assembly between a full forward seating position wherein said upper end of said rear leg abuts said front pin and a full rearward seating position wherein said upper end of said rear leg abuts said rear pin, said seat adjustment mechanism lockable in said locked state at any of a plurality of seating positions between and including said full forward and full rearward seating positions.

* * * * *